United States Patent [19]

Seno et al.

[11] Patent Number: 5,661,389
[45] Date of Patent: Aug. 26, 1997

[54] COMPACT CIRCUIT FOR CONTROLLING A FLOPPY DISK DRIVER

[75] Inventors: Koichi Seno; Yoshihito Otomo, both of Tendo, Japan

[73] Assignee: Mitsumi Electric Co., Ltd., Tokyo, Japan

[21] Appl. No.: 608,469

[22] Filed: Feb. 28, 1996

[30] Foreign Application Priority Data

Feb. 28, 1995 [JP] Japan .................................. 7-040904

[51] Int. Cl.$^6$ .............................. G11B 17/03; H03F 3/18; H02P 8/00
[52] U.S. Cl. ........................ 318/696; 360/78.13; 330/307
[58] Field of Search ........................ 318/685, 696, 318/254; 360/69, 75, 78.04, 78.12, 78.13; 330/307

[56] References Cited

U.S. PATENT DOCUMENTS 4,786,995  11/1988  Stupeck et al. ........................ 360/75
5,400,190  3/1995  Miura ........................ 360/69
5,521,768  5/1996  Shrinkle et al. ........................ 360/69

FOREIGN PATENT DOCUMENTS 1-257927  10/1989  Japan .

Primary Examiner—Bentsu Ro
Attorney, Agent, or Firm—Frishauf, Holtz, Goodman, Langer & Chick

[57] ABSTRACT

In a floppy disk driver controlling circuit which is for use in controlling a floppy disk driver including a stepping motor (23) and which comprises a stepping motor driver (21) for producing a driving current to drive the stepping motor and a control section (22) for controlling the stepping motor driver, each of the control section and the stepping motor driver includes CMOS transistors as switching transistors. A combination of the control section and the stepping motor driver is formed as a single CMOS integrated circuit (25). The stepping motor driver produces the driving current between 80 mA and 250 mA, both inclusive, to drive the stepping motor when the stepping motor has a diameter which is substantially equal to 15 mm.

6 Claims, 4 Drawing Sheets

COMPACT CIRCUIT FOR CONTROLLING A FLOPPY DISK DRIVER

BACKGROUND OF THE INVENTION

This invention relates to a floppy disk driver controlling circuit for controlling a floppy disk driver including a stepping motor. This invention also relates to a combination of the floppy disk driver and the floppy disk driver controlling circuit.

A floppy disk driver controlling circuit is for use in controlling a floppy disk driver including a stepping motor. The floppy disk driver comprises a stepping motor driver for producing a driving current to drive the stepping motor and a control section for controlling the stepping motor driver.

In a typical conventional floppy disk driver controlling circuit, the stepping motor driver is mainly composed of bipolar transistors while the control section is mainly composed of CMOS transistors. Accordingly, the stepping motor driver and the control section must be individually and separately formed and can not be integrated together. This results in a problem that the floppy disk driver controlling circuit itself can not be reduced in size.

Japanese Unexamined Patent Publication No. 257927/1989 (Tokkai Hei 1-257927) discloses a motor driver device comprising a motor driver circuit for driving a stepping motor and a control circuit for controlling the motor driver circuit. In this motor driver device, both of the motor driver circuit and the control circuit are formed by CMOS transistors. A combination of the motor driver circuit and the control circuit is integrated on a single chip. However, this motor driver device is for use in a camera to drive a stepping motor for opening and closing a shutter. In this connection, the motor driver device is different in the field of art from the above-mentioned floppy disk driver controlling circuit to which this invention is applicable. Therefore, the above-mentioned problem in the conventional floppy disk driver controlling circuit still remains unsolved.

SUMMARY OF THE INVENTION

It is therefore an object of this invention to provide a floppy disk driver controlling circuit which is compact and inexpensive.

It is another object of this invention to provide a combination of a floppy disk driver including a stepping motor which can be driven by a small driving current, and a compact and inexpensive floppy disk driver controlling circuit for controlling the floppy disk driver.

A floppy disk driver controlling circuit to which this invention is applicable is for use in controlling a floppy disk driver which comprises a magnetic head for accessing a floppy disk and a stepping motor for moving the magnetic head along a radial direction of the floppy disk when the stepping motor is driven, the floppy disk driver controlling circuit comprising a stepping motor driver for producing a driving current to drive the stepping motor and a control section for controlling the stepping motor driver.

According to this invention, each of the control section and the stepping motor driver includes CMOS (complementary metal-oxide semiconductor) transistors as switching transistors. A combination of the control section and the stepping motor driver is formed as a single CMOS integrated circuit. The stepping motor driver producing the driving current between 80 mA and 250 mA, both inclusive, to drive the stepping motor when the stepping motor has a diameter which is substantially equal to 15 mm.

A combination of a floppy disk driver and a floppy disk driver controlling circuit to which this invention is applicable is for use in controlling the floppy disk driver. The floppy disk driver comprises a magnetic head for accessing a floppy disk and a stepping motor for moving the magnetic head along a radial direction of the floppy disk when the stepping motor is driven. The floppy disk driver controlling circuit comprises a stepping motor driver for producing a driving current to drive the stepping motor and a control section for controlling the stepping motor driver.

According to this invention, the stepping motor has a diameter which is substantially equal to 15 mm. Each of the control section and the stepping motor driver includes CMOS (complementary metal-oxide semiconductor) transistors as switching transistors. A combination of the control section and the stepping motor driver is formed as a single CMOS integrated circuit. The stepping motor driver produces the driving current between 80 mA and 250 mA, both inclusive, to drive the stepping motor.

DESCRIPTION OF THE PREFERRED EMBODIMENT

For a better understanding of this invention, a conventional floppy disk driver controlling circuit will at first be described with reference to FIG. 1. The illustrated floppy disk driver controlling circuit is equivalent to the conventional floppy disk driver controlling circuit described in the preamble of the present specification.

Generally, a floppy disk driver includes a disk table assembly (disk holder mechanism) and a carriage assembly (magnetic head feeder mechanism).

The disk table assembly is rotatably held by a main frame through a spring. A floppy disk 40 is held by the disk table assembly. The main frame is provided with a motor (direct motor) for driving a rotation of the disk table assembly to thereby rotate the floppy disk 40.

On the other hand, the carriage assembly includes a magnetic head 41 and a carriage. The magnetic head 41 is held by the carriage to be movable along a predetermined radial direction with respect to the floppy disk 40. The carriage (or the magnetic head 41) is driven by a stepping motor 14 to move along the predetermined radial direction.

The floppy disk driver controlling circuit is for use in controlling the above-mentioned floppy disk driver including the stepping motor 14.

Figure 1:
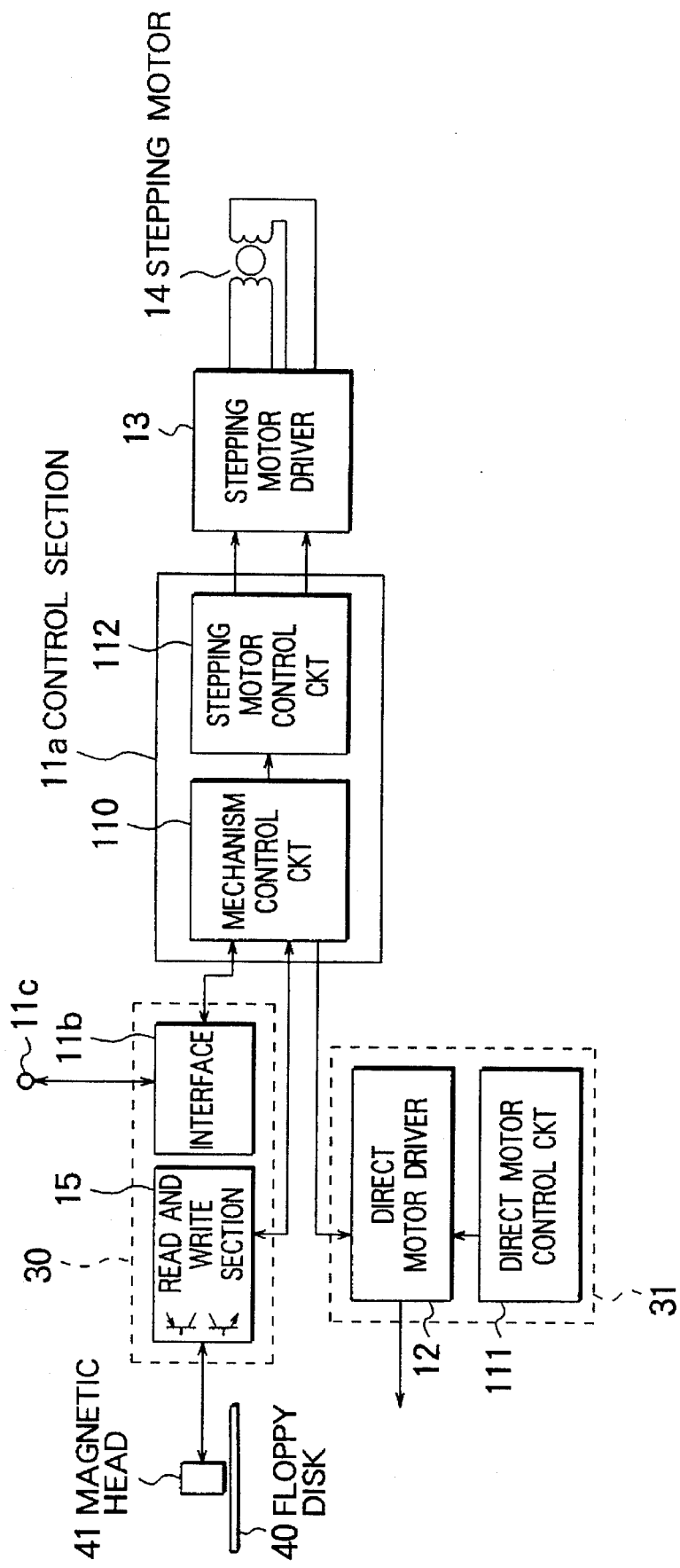
FIG. 1 is a block diagram of a conventional floppy disk driver controlling circuit together with a stepping motor.

The floppy disk driver controlling circuit illustrated in FIG. 1 comprises a control section 11a and a stepping motor driver 13. The control section 11a comprises a mechanism control circuit 110 and a stepping motor control circuit 112. The mechanism control circuit 110 is responsive to a control signal supplied from a host computer (not shown), such as a personal computer, through an input/output terminal 11c and an interface 11b and controls the stepping motor control circuit 112, a read and write section 15, and a direct motor driver 12.

Under the control of the stepping motor control circuit 112, the stepping motor driver 13 drives the stepping motor 14. The direct motor driver 12 drives a direct motor (not shown) under the control of a direct motor control circuit 111 and the mechanism control circuit 110.

Under the control of the mechanism control circuit 110, the read and write section 15 carries out reading and writing operations from and to the floppy disk 40 by the use of the magnetic head 41. Readout data read from the floppy disk 40 are sent from the read and write section 15 to the host computer through the mechanism control circuit 110, the interface 11b, and the input/output terminal 11c. On the other hand, write-in data to be written into the floppy disk 40 are sent from the host computer to the read and write section 15 through the input/output terminal 11c, the interface 11b, and the mechanism control circuit 110.

Generally, the above-mentioned control section 11a includes CMOS (complementary metal-oxide semiconductor) transistors as switching transistors. In other words, the control section 11a is mainly composed of the CMOS transistors. On the other hand, the stepping motor driver 13 is required to feed the stepping motor 14 with a driving current as large as 400 mA/phase. In this connection, the stepping motor driver 13 uses bipolar transistors which are durable against such a large driving current. In other words, the stepping motor driver 13 is mainly composed of the bipolar transistors. Specifically, the stepping motor driver 13 is formed on a single semiconductor substrate as a single bipolar integrated circuit (IC) comprising the bipolar transistors, other active elements, passive elements, and the like.

The read and write section 15 is mainly composed of bipolar transistors also. The reason why the read and write section 15 is mainly composed of the bipolar transistors will hereafter be described. The readout data read from the floppy disk 40 by the magnetic head 41 do not have a completely digital waveform consisting of a logic "1" level (high level) and a logic "0" level (low level) but have an analog-like waveform. In this connection, the read and write section 15 comprises an A/D conversion circuit for carrying out A/D (analog-to-digital) conversion to convert the readout data into a completely digital waveform. In order to convert the analog-like waveform into the completely digital waveform, it is essential to use as the switching transistors the bipolar transistors having a linear characteristic.

In the illustrated example, the interface 11b is mainly composed of the bipolar transistors. Instead, the interface 11b may be mainly composed of CMOS transistors. This is because the interface 11b has such a circuit characteristic that does not require the interface 11b to be formed mainly by the bipolar transistors.

Specifically, a combination of the read and write section 15 and the interface 11b is formed on a single semiconductor substrate as a single bipolar integrated circuit (IC) 30 comprising the bipolar transistors, other active elements, passive elements, and the like.

Likewise, each of the direct motor control circuit 111 and the direct motor driver 12 is mainly. composed of bipolar transistors. Specifically, a combination of the direct motor control circuit 111 and the direct motor driver 12 is formed on a single semiconductor substrate as a single bipolar integrated circuit (IC) 31 comprising the bipolar transistors, other active elements, passive elements, and the like.

As described above, in the floppy disk driver controlling circuit illustrated in FIG. 1, the stepping motor driver 13 is mainly composed of the bipolar transistors while the control section 11 is mainly composed of the CMOS transistors. Accordingly, the control section 11 and the stepping motor driver 13 must be individually and separately formed and can not be integrated together. This result in a problem that the floppy disk driver controlling circuit itself can not be reduced in size.

This invention provides a compact and inexpensive floppy disk driver controlling circuit.

This invention also provides a combination of a floppy disk driver including a stepping motor which can be driven by a small driving current, and a compact and inexpensive floppy disk driver controlling circuit for controlling the floppy disk driver.

Figure 2:
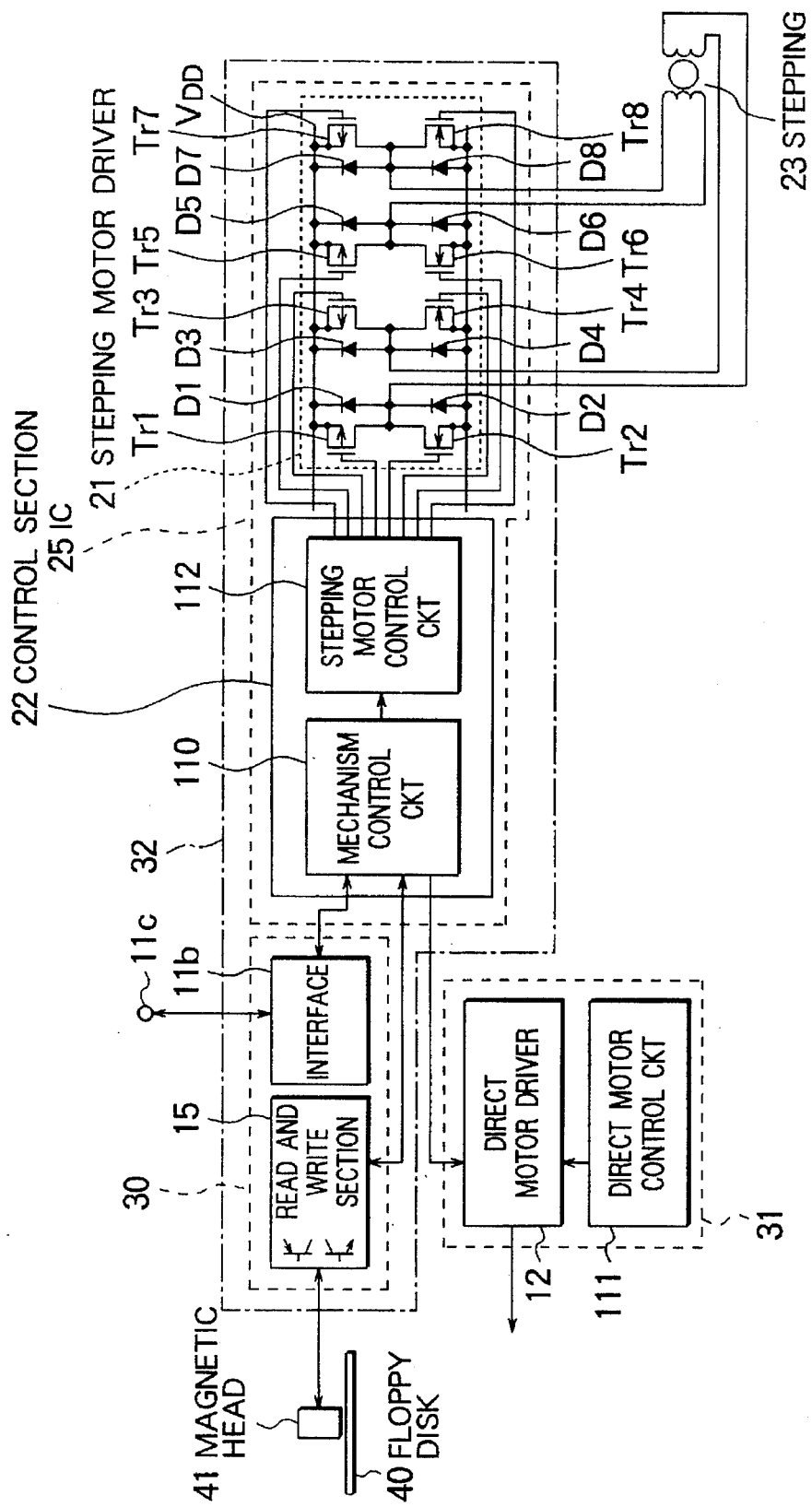
FIG. 2 is a block diagram of a floppy disk driver controlling circuit according to one embodiment of this invention together with a stepping motor.

Referring to FIG. 2, a floppy disk driver controlling circuit according to one embodiment of this invention comprises similar parts designated by like reference numerals. The floppy disk driver controlling circuit is for use in controlling a floppy disk driver including a stepping motor 23 and comprises a control section 22 for controlling the disk driver and a stepping motor driver 21 for producing a driving current to drive the stepping motor 23. Like the control section 11a in FIG. 1, the control section 22 comprises a mechanism control circuit 110 and a stepping motor control circuit 112. As described in conjunction with FIG. 1, each of the mechanism control circuit 110 and the stepping motor control circuit 112 includes CMOS (complementary metal-oxide semiconductor) transistors as switching transistors. In other words, the control section 22 is mainly composed of the CMOS transistors.

The stepping motor driver 21 also includes CMOS transistors as switching transistors. In other words, the stepping motor driver 21 is mainly composed of the CMOS transistors.

A combination of the control section 22 and the stepping motor driver 21 is formed as a single CMOS integrated circuit (IC) 25. Specifically, the control section 22 and the stepping motor driver 21 are formed on a predetermined area of a single semiconductor substrate as the single CMOS integrated circuit (IC) 25 comprising the CMOS transistors, other active elements, passive elements, and the like.

In the illustrated example, each of a read and write section 15 and an interface 11b is mainly composed of bipolar transistors. A combination of the read and write section 15 and the interface 11b is formed on a remaining area of the single semiconductor substrate as a single bipolar integrated circuit 30. Specifically, the CMOS integrated circuit 25 and the bipolar integrated circuit 30 are arranged on the above-mentioned single semiconductor substrate in a positional relationship illustrated in the figure to form a single bipolar-CMOS integrated circuit 32.

In the illustrated example, the interface 11 is mainly composed of the bipolar transistors. Alternatively, the interface 11b may be mainly composed of CMOS transistors as described above. In this event, the interface 11b is integrated into the single CMOS integrated circuit 25 together with the control section 22 and the stepping motor driver 21.

The stepping motor 23 has a diameter substantially equal to 15 mm. The stepping motor driver 21 produces a driving current between 80 mA and 250 mA to drive the stepping motor 23.

Description will now be directed to the CMOS integrated circuit 25. The control section 22 and the stepping motor driver 21 are arranged in a positional relationship illustrated in the figure to form the CMOS integrated circuit 25. The stepping motor driver 21 comprises first through eighth MOS transistors Tr1 through Tr8 and first through eighth diodes D1 through D8.

Each of the first, the third, the fifth, and the seventh MOS transistors Tr1, Tr3, Tr5, and Tr7 is a P-channel transistor. Each of the Second, the fourth, the sixth, and the eighth MOS transistors Tr2, Tr4, Tr6, and Tr8 is an N-channel transistor.

A combination of the first and the second MOS transistors Tr1 and Tr2 forms a first CMOS transistor. The first CMOS transistor is connected between a voltage supply line $V_{DD}$ and a reference potential line. Similarly, a combination of the third and the fourth MOS transistors Tr3 and Tr4 forms a second CMOS transistor. The second CMOS transistor is also connected between the voltage supply line $V_{DD}$ and the reference potential line. A combination of the fifth and the sixth MOS transistors Tr5 and Tr6 forms a third CMOS transistor. The third CMOS transistor is also connected between the voltage supply line $V_{DD}$ and the reference potential line. Similarly, a combination of the seventh and the eighth MOS transistors Tr7 and Tr8 forms a fourth CMOS transistor. The fourth CMOS transistor is also connected between the voltage supply line $V_{DD}$ and the reference potential line.

The first diode D1 is connected between a drain and a source of the first MOS transistor Tr1 to protect the first MOS transistor Tr1. Similarly, the second through the eighth diodes D2 through D8 are connected to the second through the eighth MOS transistors Tr2 through Tr8 to protect the second through the eighth MOS transistors Tr2 through Tr8, respectively.

Gates of the first through the eighth MOS transistors Tr1 through Tr8 are connected to the stepping motor control circuit 112 of the control section 22. Connected to the first through the eighth MOS transistors Tr1 through Tr8, the stepping motor control circuit 112 controls on and off of the first through the eighth MOS transistors Tr1 through Tr8. A connection point between the first and the second MOS transistors Tr1 and Tr2 (an output point of the first CMOS transistor) and a connection point between the third and the fourth MOS transistors Tr3 and Tr4 (an output point of the second CMOS transistor) are connected to a first armature of the stepping motor 23. A connection point between the fifth and the sixth MOS transistors Tr5 and Tr6 (an output point of the third CMOS transistor) and a connection point between the seventh and the eighth MOS transistors Tr7 and Tr8 (an output point of the fourth CMOS transistor) are connected to a second armature of the stepping motor 23.

Similarly, the control section 22 comprises a plurality of the CMOS transistors each of which is formed by a pair of P-channel and N-channel transistors.

Figure 3:
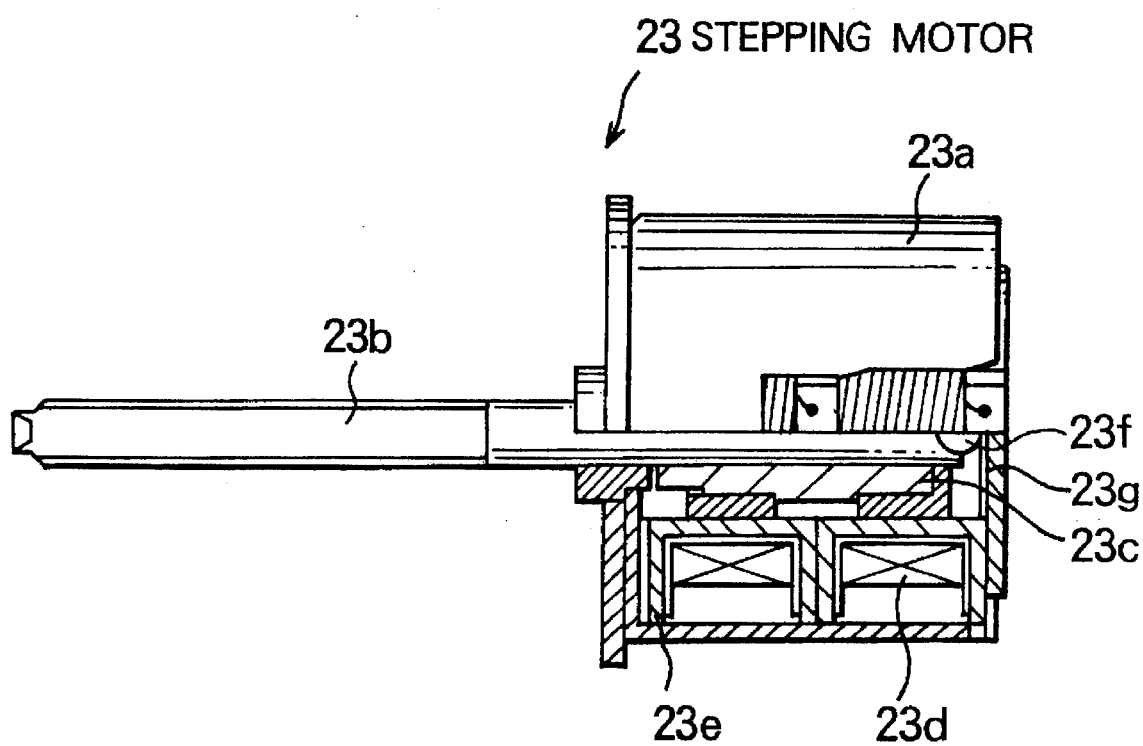
FIG. 3 shows, partially in section, the stepping motor illustrated in FIG. 2.

Referring to FIG. 3, the stepping motor 23 has a case assembly 23a which rotatably supports a driving shaft 23b. In the case assembly 23a, a motor assembly 23c is attached to the driving shaft 23b. A coil assembly 23d is arranged in the case assembly 23a to face the rotor assembly 23c through a spacer 23e. A steel ball 23f and a thrust spring 23g are arranged in the case assembly 23a.

As described in conjunction with FIG. 1, the stepping motor generally requires supply of a large current, for example, as large as 400 mA/phase. On the other hand, in order to form the control section 22 and the stepping motor driver 21 as the single integrated circuit 25, the stepping motor driver 21 must by composed of the CMOS transistors as described above. In this structure, the stepping motor 23 must be fully operable by a driving current as small as 250 mA.

Figure 4:
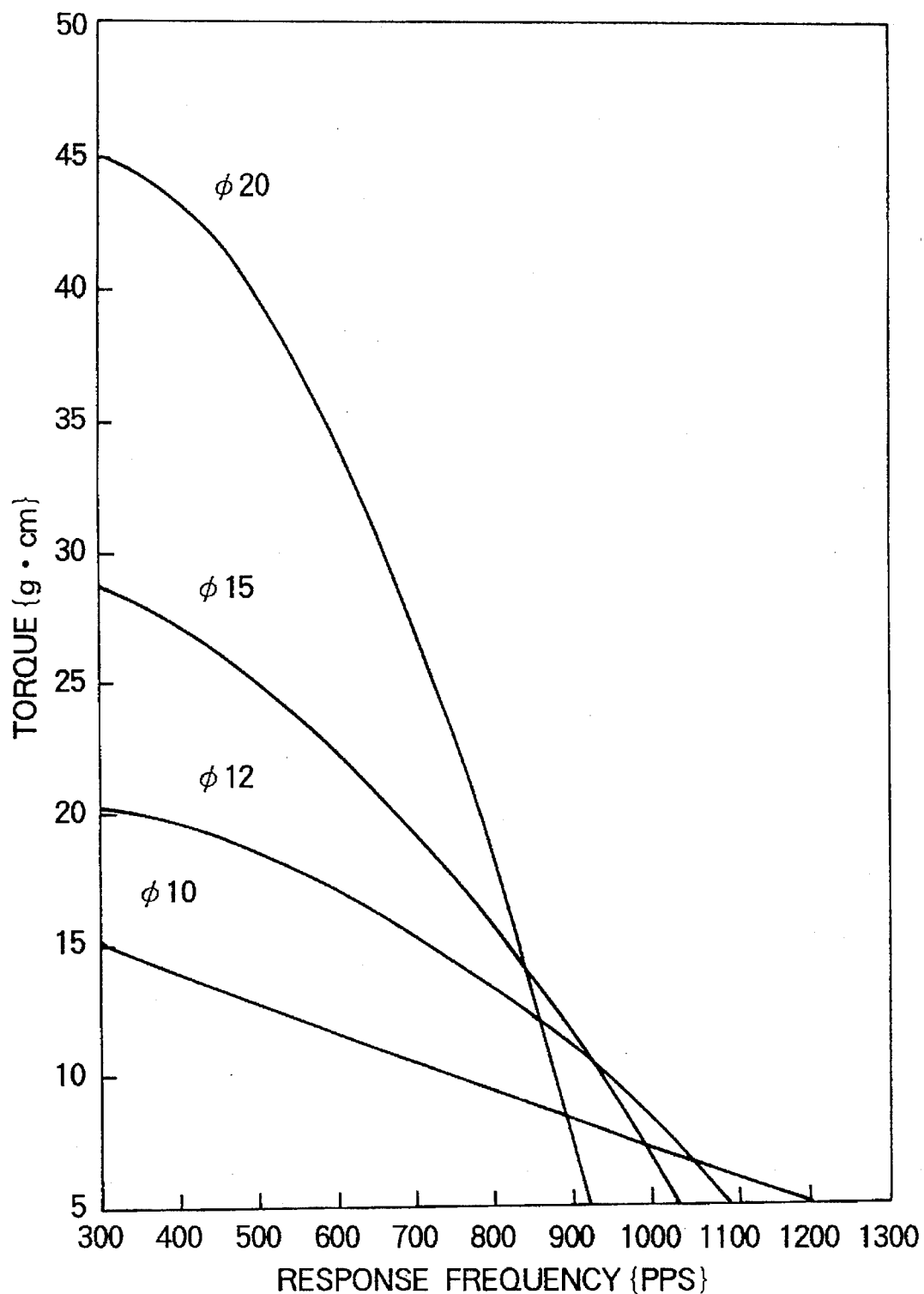
FIG. 4 is a view for describing a relationship between a torque and a diameter of the stepping motor illustrated in FIG. 2.

In order to examine a relationship between a motor torque and a motor diameter, the present inventors made experimental studies for different diameters of the case assembly 23a. Specifically, the diameter of the case assembly 23a, namely, the motor diameter is selected to be φ 20 (20 mm), φ 15 (15 mm), φ 12 (12 mm), and φ 10 (10 mm). FIG. 4 shows a relationship between a torque (g·cm) and a response frequency (PPS (pulses per second)) for each motor diameter. Referring to FIG. 4, the relationship between the torque and the response frequency for each motor diameter is given in a condition where a constant current of 250 mA is kept during holding of the stepping motor. Taking into account that the response frequency required in the floppy disk driver is 900 PPS (pulses per second), it is understood that the motor diameter equal to φ 15 (15 mm) provides a maximum torque.

As described above, the motor diameter 15 mm provides the maximum torque. Accordingly, even if the driving current is lowered, the stepping motor produces a torque sufficient for the floppy disk driver. Specifically, with the motor diameter selected at 15 mm, a coil resistance is increased (for example, by increasing the number of turns or by increasing the number of turns and reducing the coil diameter) to lower the driving current to 250 mA.

When the driving current is lowered as described above, the torque is decreased. On the other hand, a response characteristic is improved. If the motor diameter is selected at 15 mm, a sufficient torque sufficient for the floppy disk driver is obtained.

By the use of the stepping motor having a motor diameter of 15 mm, a sufficient torque is obtained even if the driving current is as low as 250 mA. As a result, the stepping motor driver can be composed of the CMOS transistors.

The relationship between the response frequency and the torque for each motor diameter as illustrated in FIG. 4 is given in the condition where the driving current is equal to 250 mA, as described above. Now, let the driving current be lowered to 80 mA to observe the similar characteristic. Although the torque for each motor diameter is reduced at such a low driving current, a higher torque at the response frequency of 900 PPS is obtained in the order identical to that illustrated in FIG. 4. In other words, although a greater torque is obtained at a higher driving current, the torque at the response frequency of 900 PPS becomes maximum at a particular driving current (herein, 80 mA) when the motor diameter is equal to φ 15 (15 mm).

Thus, when the motor diameter is equal to 15 mm, a sufficient torque for the floppy disk driver is obtained even when the driving current is as low as 80 mA. It is noted that the motor diameter is not strictly equal to 15 mm but may be slightly deviated therefrom. Thus, with the motor diameter substantially equal to 15 mm and the driving current between 80 mA and 250 mA, the floppy disk driver produces a sufficient torque.

As described above, it is possible according to this invention to obtain a sufficient torque even if the motor driving current is lowered. Accordingly, the stepping motor driver can be implemented by the CMOS transistors and can consequently be integrated into the single IC together with the control section. It is therefore possible to make the floppy disk driver controlling circuit itself compact and inexpensive.

What is claimed is:

1. A floppy disk driver controlling circuit for use in controlling a floppy disk driver which comprises a magnetic head for accessing a floppy disk and a stepping motor for moving said magnetic head along a radial direction of said floppy disk when said stepping motor is driven, said floppy disk driver controlling circuit comprising a stepping motor driver for producing a driving current to drive said stepping motor and a control section for controlling said stepping motor driver, wherein:

each of said control section and said stepping motor driver includes CMOS (complementary metal-oxide semiconductor) transistors as switching transistors;

a combination of said control section and said stepping motor driver being formed as a single CMOS integrated circuit;

said stepping motor driver producing said driving current between 80 mA and 250 mA, both inclusive, to drive said stepping motor when said stepping motor has a diameter which is substantially equal to 15 mm.

2. A floppy disk driver controlling circuit as claimed in claim 1, wherein:

said combination of the control section and the stepping motor driver is formed on a predetermined area of a single semiconductor substrate as said single CMOS integrated circuit.

3. A floppy disk driver controlling circuit as claimed in claim 2, said floppy disk driver further comprising a read and write section to make said magnetic head carry out reading and writing operations from and to said floppy disk, said read and write section including bipolar transistors as switching transistors, wherein:

said read and write section is formed on a remaining area of said single semiconductor substrate as a bipolar integrated circuit.

4. A combination of a floppy disk driver and a floppy disk driver controlling circuit for use in controlling said floppy disk driver, said floppy disk driver comprising a magnetic head for accessing a floppy disk and a stepping motor for moving said magnetic head along a radial direction of said floppy disk when said stepping motor is driven, said floppy disk driver controlling circuit comprising a stepping motor driver for producing a driving current to drive said stepping motor and a control section for controlling said stepping motor driver, wherein:

said stepping motor has a diameter which is substantially equal to 15 mm;

each of said control section and said stepping motor driver including CMOS (complementary metal-oxide semiconductor) transistors as switching transistors;

a combination of said control section and said stepping motor driver being formed as a single CMOS integrated circuit;

said stepping motor driver producing said driving current between 80 mA and 250 mA, both inclusive, to drive said stepping motor.

5. A combination of a floppy disk driver and a floppy disk driver controlling circuit as claimed in claim 4, wherein:

said combination of the control section and the stepping motor driver is formed on a predetermined area of a single semiconductor substrate as said single CMOS integrated circuit.

6. A combination of a floppy disk driver and a floppy disk driver controlling circuit as claimed in claim 5, said floppy disk driver further comprising a read and write section to make said magnetic head carry out reading and writing operations from and to said floppy disk, said read and write section including bipolar transistors as switching transistors, wherein:

said read and write section is formed on a remaining area of said single semiconductor substrate as a bipolar integrated circuit.

* * * * *